United States Patent [19]

Everts et al.

[11] Patent Number: 5,337,626
[45] Date of Patent: Aug. 16, 1994

[54] LAMINATED GEAR AND METHOD OF FORMING A LAMINATED GEAR

[75] Inventors: Robert G. Everts, Chandler; Harry G. Rickard, Phoenix, both of Ariz.

[73] Assignee: Ryobi Outdoor Products, Inc., Chandler, Ariz.

[21] Appl. No.: 21,495

[22] Filed: Feb. 23, 1993

[51] Int. Cl.⁵ .............................................. F16H 55/12
[52] U.S. Cl. ......................................... 74/445; 74/449
[58] Field of Search .......................... 74/439, 445, 449

[56] References Cited

U.S. PATENT DOCUMENTS

| | | |
|---|---|---|
| 846,549 | 3/1907 | Clark . |
| 890,870 | 6/1908 | Reed . |
| 951,503 | 3/1910 | Johnston . |
| 1,382,089 | 7/1921 | Johnston et al. . |
| 1,445,358 | 2/1923 | Russell . |
| 1,662,026 | 9/1925 | Brophy . |
| 2,709,375 | 2/1950 | Sandberg . |
| 2,923,166 | 2/1960 | Brindley et al. . |
| 2,931,094 | 4/1960 | Teerlink . |
| 4,131,032 | 12/1978 | Warland et al. . |
| 4,356,605 | 11/1982 | Everts . |
| 4,522,080 | 6/1985 | Santi . |
| 4,597,365 | 7/1986 | Madaffer . |
| 4,630,498 | 12/1986 | Santi . |
| 4,763,614 | 8/1988 | Burgio di Aragona . |
| 4,774,852 | 10/1988 | Matt . |
| 4,809,562 | 3/1989 | Bendoraitas et al. . |

FOREIGN PATENT DOCUMENTS

| | | | |
|---|---|---|---|
| 158346 | 8/1954 | Australia | 74/445 |
| 405279 | 2/1923 | Fed. Rep. of Germany | 74/445 |
| 3026685 | 2/1982 | Fed. Rep. of Germany | 74/445 |
| 58-128563 | 8/1983 | Japan | 74/445 |
| 62-2833 | 1/1987 | Japan . | |
| 4-64756 | 2/1992 | Japan | 74/449 |
| 1093846 | 5/1984 | U.S.S.R. | 74/445 |

OTHER PUBLICATIONS

"The Little Engine that Could", by Judith A. Gunther, published in the March, 1993, Popular Science Magazine.

Primary Examiner—Leslie A. Braun
Assistant Examiner—David W. Laub
Attorney, Agent, or Firm—Brooks & Kushman

[57] ABSTRACT

A laminated gear and a method of forming the laminated gear are disclosed. The method comprises punching a central hole and a circular array of closely adjacent perforations in a generally planar sheet. The array defines an interior portion having the outline of the gear, and a selvedge portion disposed outboard the perforations. The central hole and the perforations are progressively stamped until they have burnished faces perpendicular to the sides of the sheet. Web portions interconnecting the interior and selvedge portions are then broken to separate the gear from the sheet. A projection and corresponding recess are then stamped on the opposite sides of the gear. A predetermined number of gears are queued and finally arranged into an assembly by frictionally nesting the projections and corresponding recesses. The central holes are thereby aligned to form a bore adapted to be press fit onto a camshaft or crankshaft. The laminated gear formed by this method is also disclosed.

4 Claims, 3 Drawing Sheets

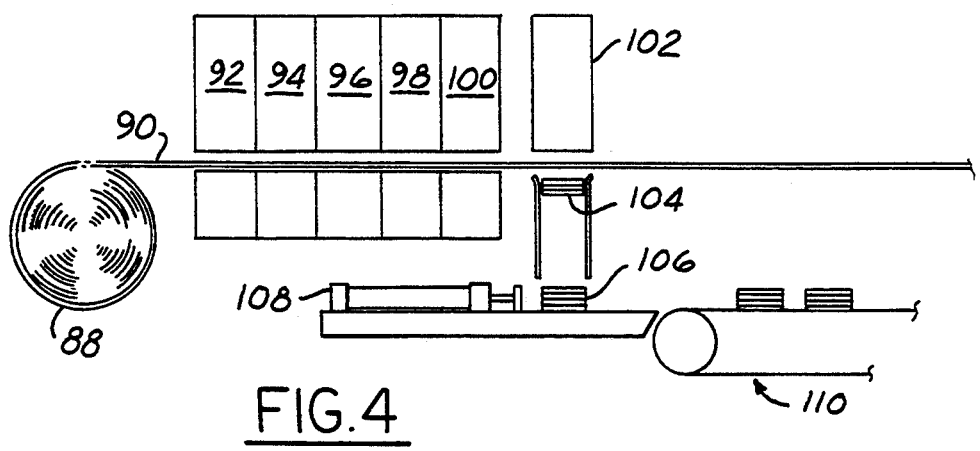
FIG.4
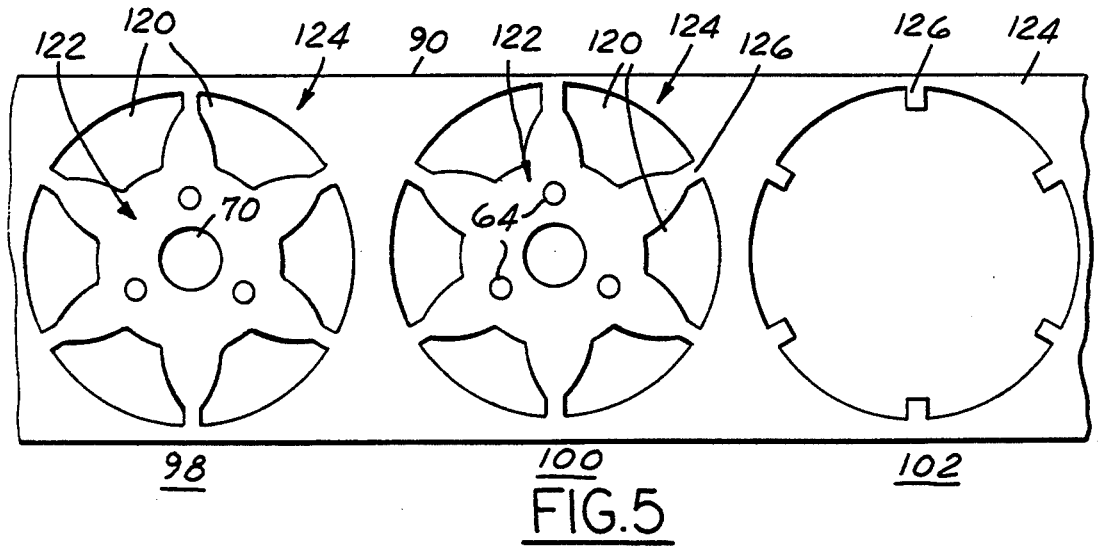
FIG.5
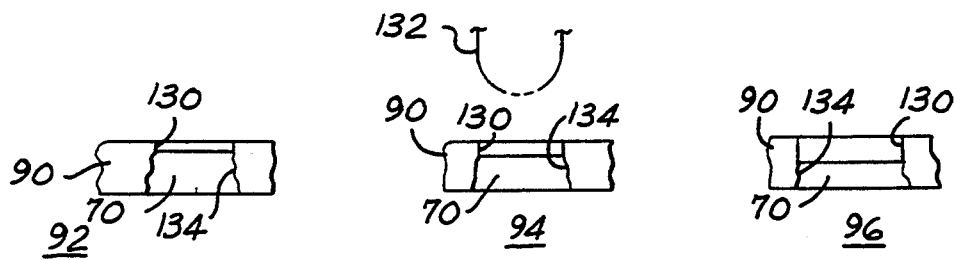
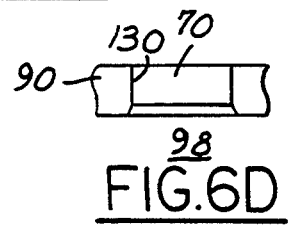
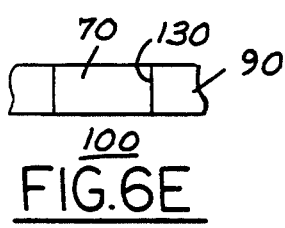

LAMINATED GEAR AND METHOD OF FORMING A LAMINATED GEAR

TECHNICAL FIELD

This invention relates to gears, and more particularly to laminated gears for use in small internal combustion engines.

BACKGROUND ART

Small internal combustion four cycle engines typically include a cam gear and a pair of cam lobes mounted on a camshaft. The cam gear meshes with a crankgear mounted on a crankshaft, thereby rotating the camshaft in timed relation to the engine cycle. Each rotating cam lobe then opens and closes either an exhaust or an intake valve.

It is known to form cam lobes and cam gears from a laminated stack of thin gear elements. U.S. Pat. Nos. 4,522,080 and 4,630,498 to Santi disclose a laminated wheel assembly which includes a cam lobe and a cam gear mounted on a camshaft. The cam gear is constructed of a laminated stack of flat plates which abut one another. The cam gear is press fit onto the camshaft, and only the frictional forces between the gear and the camshaft maintain the plate teeth together. The cam lobe is also constructed of a laminated stack of plates and press fit onto the camshaft in substantially the same manner to form an integral cam surface. However, the camshaft includes a serrated portion on its outside surface having tapered teeth that cut into the inner surfaces of the cam lobe and cam gear to secure the cam lobe and cam gear both axially and circumferentially thereon.

Another application of laminated plates in a small engine is shown in my U.S. Pat. No. 4,356,605. That patent discloses a crankshaft with a laminated counterweight having coaxially aligned bosses and depressions, which are pressed together and act as fastening means.

Heretofore, however, it has been necessary to machine or otherwise finish the teeth of laminated gears to ensure that they are sufficiently smooth and aligned. Because this process adds time and expense to the gear forming operation, there exists a need for laminated small engine gears formed by a speedier and less expensive method.

DISCLOSURE OF THE INVENTION

A laminated gear and a method of forming a laminated gear from a thin sheet having generally planar first and second sides is disclosed. The method comprises punching a central hole and a circular array of closely adjacent perforations in the sheet. The array is coaxial with the central hole so as to form an interior portion defining the outline of the gear and a selvedge portion disposed outboard the perforations. The interior and selvedge portions remain interconnected at this point by a plurality of web portions defined between adjacent perforations. The central hole and the perforations are progressively stamped until the central hole and the perforations have burnished faces perpendicular to the first and second sides of the sheet. The web portions are then broken to separate the gear from the selvedge portion. A projection and corresponding recess are then stamped on the first and second side of the gear, respectively. A predetermined number of gears are queued and finally arranged into an assembly by frictionally nesting the projections and corresponding recesses. The central holes are thus aligned to form a bore adapted to be sufficiently press fit onto a shaft to maintain the gear rotationally and axially secured to the shaft.

The laminated gear formed by this method comprises a plurality of laminates abutting each other in a stacked relationship. The laminates have a first planar side, a second planar side, and a circumferential edge. A projection on the first side of the laminate extends above the plane defined by the first side, and a corresponding recess on the second side of the laminate is depressed below the plane defined by the second side. A plurality of teeth are formed in the circumferential edge of the laminate, each tooth having a relatively smooth burnished face formed by progressive stamping so as to be perpendicular to the planar sides of the laminate. A central hole is also formed through each laminate. The laminates are held rotationally and axially relative to each other in the stacked relationship by frictional nesting of the projections and corresponding recesses. The central holes are thereby aligned and form a bore adapted to be sufficiently press fit onto a central shaft to maintain the gear rotationally and axially secured to the central shaft.

Accordingly, it is an object of the present invention to provide a laminated gear of the type described above which is formed more quickly and inexpensively than known laminated gears.

Another object of the present invention is to provide a laminated gear of the type described above having gear teeth and a central hole which are formed by progressive stamping.

Another object of the present invention is to provide a laminated gear of the type described above in which the central holes have burnished faces and are alignable to form a bore adapted to be sufficiently press fit onto a shaft to maintain the gear rotationally and axially secured to the shaft.

These and other objects, features, and advantages of the present invention will be more apparent from the following description and drawings.

BRIEF DESCRIPTION OF THE DRAWINGS

FIG. 4 is a diagrammatic view of a progressive stamping operation for forming the laminated gears;

FIG. 5 is a plan view of a section of sheet metal stock showing the outline of a gear laminate at progressive stamping stations;

FIGS. 6a–6e are a series of cross-sectional views showing the burnishing of a central hole of a laminate as it is progressively stamped.

BEST MODE FOR CARRYING OUT THE INVENTION

With reference to the drawings, the preferred embodiment of the present invention will be described.

Figure 1:
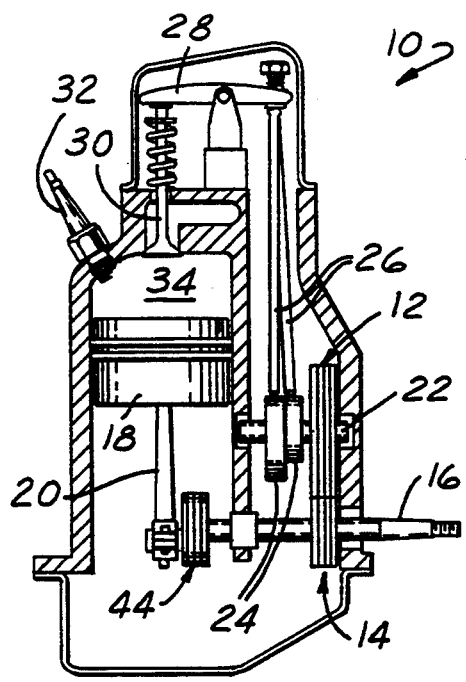
FIG. 1 is a cross-sectional view of a small internal combustion engine having a laminated cam gear and a laminated crankgear according to the present invention.

FIG. 1 shows a conventional small four cycle engine 10 having a laminated cam gear 12 and a laminated crankgear 14 according to the present invention. The crankgear 14 is mounted on a crankshaft 16, which is rotated by a reciprocating piston 18 connected thereto by a connecting rod 20. The crankgear 14 is in constant mesh with the cam gear 12. The cam gear 12 has twice the diameter and twice as many teeth as the crankgear 14, and therefore completes a revolution in twice the time. The cam gear 12 is mounted on a camshaft 22, as are two cam lobes 24. As the cam lobes 24 rotate with the camshaft 22, push rods 26 are biased upwardly by the eccentric portions of the cam lobes once per revolution. The push rods 26 in turn alternate rocker arms 28, which open and close intake and exhaust valves 30. A spark plug 32 is provided to ignite the compressed fuel-air mixture in the cylinder 34.

Figure 2:
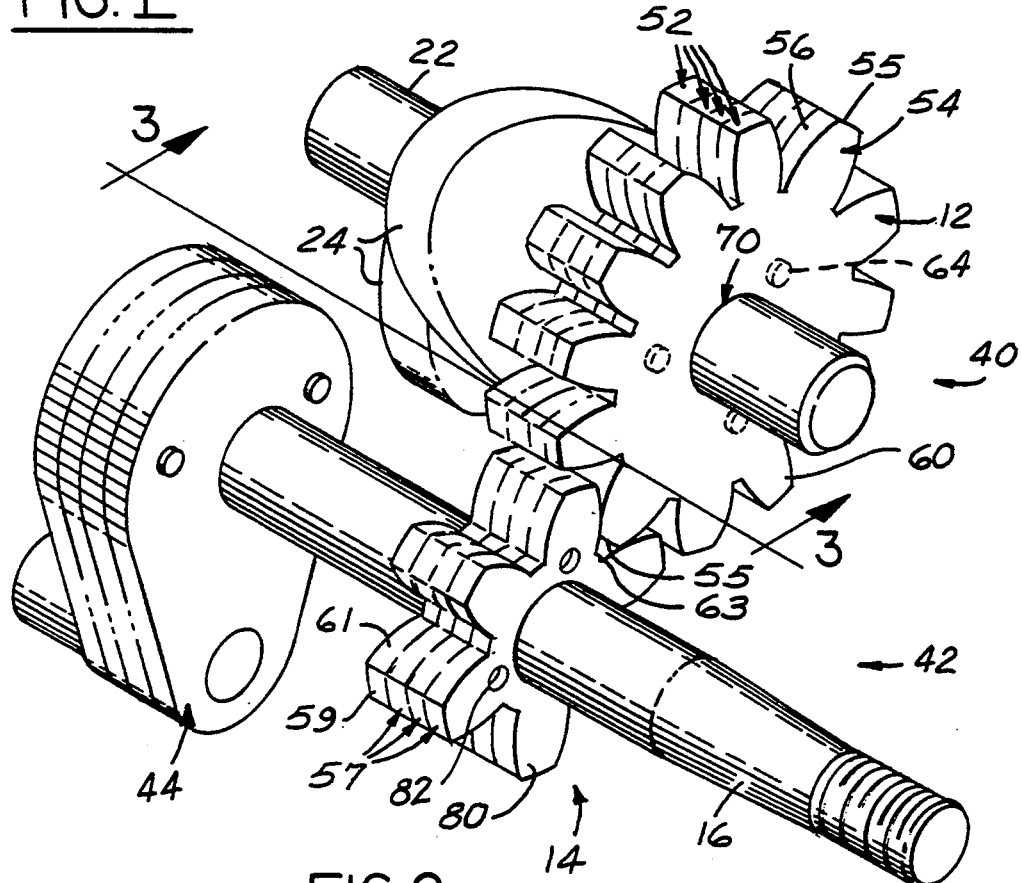
FIG. 2 is a perspective view of the laminated cam gear and laminated crankgear press fit respectively on a camshaft and on a crankshaft.

FIG. 2 shows the interrelationship of a camshaft assembly 40 and a crankshaft assembly 42. The camshaft assembly 40 includes the central camshaft 22, the two cam lobes 24, and the laminated cam gear 12. The crankshaft assembly 42 includes the crankshaft 16, the laminated crankgear 14, and a laminated counterweight 44. The laminated counterweight is preferably formed as disclosed in my U.S. Pat. No. 4,356,605, hereby incorporated by reference.

The laminated cam gear 12 comprises a plurality of laminates 52 abutting each other in a stacked relationship. Each of the laminates 52 has opposite generally planar sides, and a plurality of teeth 54 formed in the circumferential edge of the laminate. Each tooth 54 has squared off tip 55 and a burnished face region 56 perpendicular to the planar sides of the laminate 52. The burnished faces 56 are relatively smooth as the result of being formed by progressive stamping, as described below.

The laminated crankgear 14 is similarly constructed. A plurality of laminates 57 having opposite generally planar sides and a circumferential edge abut each other in a stacked relationship. Teeth 58 having squared off tips 59 and burnished faces 61 perpendicular to the planar sides of the laminates 57 are formed in the circumferential edge of each laminate 57.

Because the crankgear teeth 58 are constantly in mesh with the teeth 54 of the laminated cam gear 12, squared off gear teeth provide several advantages. First, a squared off tip such as tip 55 extends less than a conventional pointed gear tooth tip into the recess between the gear teeth on the opposite gear. This in turn allows a root portion 63 of the opposite gear to be similarly squared off, rather than indented to receive a pointed tip. In this configuration, the root portion 63 is better able to bear the load transferred by the crankgear teeth 58 to the cam gear teeth 54. Additionally, the gear teeth 54 and 58 have less mass at points furthest from their center of rotation, thus reducing their rotational momentum.

Figure 3:
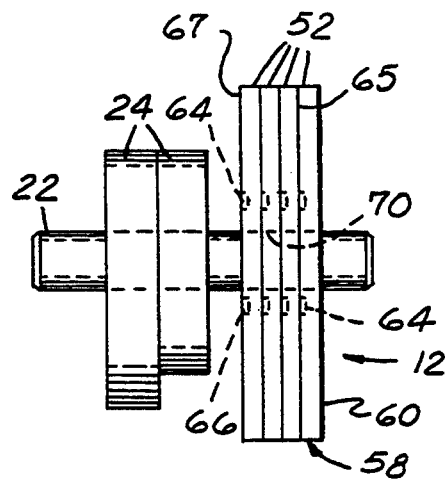
FIG. 3 is a cross-sectional view taken along line 3—3 in FIG. 2 showing the laminated cam gear and two cam lobes.

As shown in FIG. 3, each of the cam gear laminates 52 has projections 64 on a first side 65 of the laminate extending above the plane defined by the first side 65. Each laminate 52 also has corresponding recesses 66 on a second side 67 of the laminate depressed below the plane defined by the second side 67. Frictional nesting of the projections 64 and corresponding recesses 66 holds the laminates 52 rotationally and axially relative to each other in the stacked relationship. In this way, a central hole 70 in each laminate 52 is precisely aligned with the other central holes of the other laminates. When so aligned, the central holes 70 form a bore adapted to be sufficiently press fit onto the camshaft 22 to maintain the laminated cam gear 12 rotationally and axially secured thereto. The laminated crankgear 14 is similarly constructed, with the central holes therethrough forming a bore adapted to be press fit onto the camshaft 16.

A cap laminate, such as the camgear cap 60 or the crankgear cap laminate 80 shown in FIG. 2, may be provided as the top laminate on the cam gear or crankgear stack. The cap laminate 80 differs from the other laminates 52 and 57 only in that throughholes 82 extend between the opposite sides of the cap laminate in place of projections, which might interfere with any adjacent structure. Because the cap laminate 80 is the uppermost laminate in the stack, projections thereon would not serve any purpose. Similarly, a cap laminate could be provided as the bottommost laminate.

FIG. 4 shows a progressive stamping operation for forming the laminated gears. A roll 88 of sheet metal stock 90 is provided to a series of stamping stations 92, 94, 96, 98, and 100. Preferably, the metal is cold rolled steel approximately 0.075 to 0.02 inch in thickness. At the first station 92, the central hole and a circular array of closely adjacent perforations are punched in the sheet 90. At each subsequent stamping station 94, 96, 98, and 100, the central hole and the perforations are progressively stamped to burnish their inner surfaces perpendicular to the sides of the sheet 90. At location 102, the individual gear laminate is broken off from the sheet 90 and dropped into a collection 104 of gear laminates.

When a predetermined number of individual gear laminates 106 has been queued, they are arranged into the cam gear or crankgear. To frictionally nest the projections and corresponding recesses of the individual gear laminates, the stack 106 is subjected to compression or pressure. Thereafter, the completed laminated gear 106 is pushed off by an ejector 108 onto a conveyer 110 to be transported for further handling.

FIG. 5 shows the progression of the sheet 90 through stamping stations 98, 100, and 102. When the sheet 90 reaches stamping station 98, the central hole 70 and the circular array of closely adjacent perforations 120 have been roughly punched in the sheet 90 at stamping stations 92, 94, and 96. The array of perforations 120 is coaxial with the central hole 70, thus forming an interior portion 122 which defines the outline of the gear to be produced. A selvedge portion 124 is also thereby defined, disposed outboard the perforations 120.

At stamping station 100, the central hole 70 and the perforations 120 are again punched to further burnish their interior surfaces, as described more fully below. The interior and selvedge portions 122 and 124 remain interconnected through stamping station 100 by a plurality of web portions 126 defined between adjacent perforations 120. The recesses 66 are stamped at any of the stamping stations, such that the displacement of material forms the projections on the opposite side of the sheet 90. As shown at station 102, the web portions 126 are broken along a generally straight path between adjacent perforations 120 so as to form a gear with the generally squared off teeth shown in FIG. 2.

FIGS. 6(a) through 6(e) show the effects of the progressive stamping on the inner surface of the central hole 70. At the first stamping station 92, only the uppermost part 130 of the inner surface of the central hole 70 is perpendicular to the planar first and second sides of the sheet 90. At each subsequent stamping station, a burnishing tool 132 slightly widens and lengthens the burnished portion 130 of the central hole 70. By stamping station 96 shown in FIG. 6(c), for example, the roughened portions 134 of the central hole 70 which were caused by shearing of the sheet 90 when the central hole 70 was initially punched comprises only half the length of the central hole 70.

FIG. 6(e) shows that after the final stamping station 100, the central hole 70 has an entirely burnished face 130 perpendicular to the first and second sides of the sheet 90. The teeth 54 and 58 of the laminated cam gear 12 and the crankgear 14 are similarly burnished by progressively stamping the perforations 120. In this way, the central hole 70 is sized to a tolerance that it can be press fit onto the camshaft or crankshaft, and the gear teeth have sufficiently smooth teeth to mesh smoothly at high speeds. No post-formation machining of the central hole or gear teeth is necessary.

Figure 7:
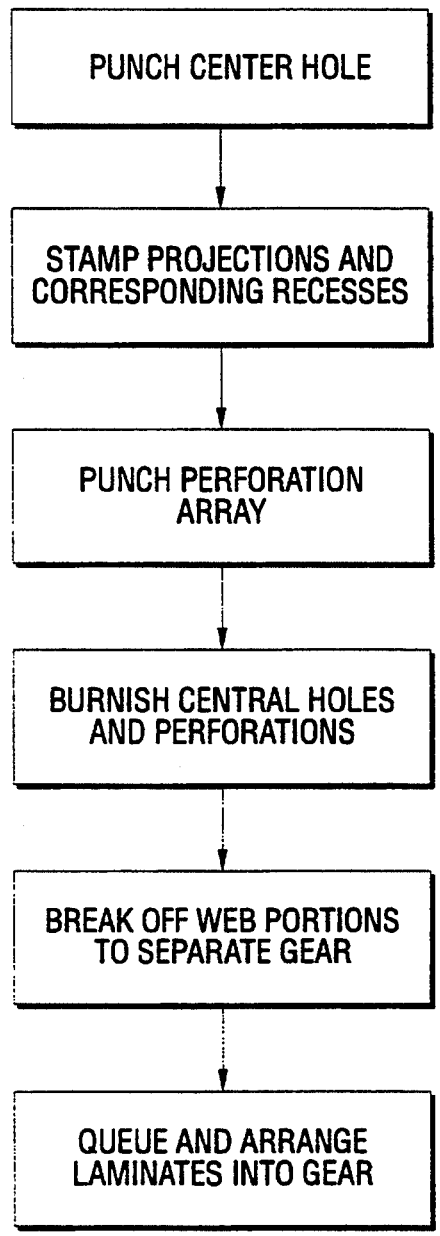
FIG. 7 is a flow chart showing a method of forming a gear from a thin sheet.

FIG. 7 shows a method of forming a gear from a thin sheet which is apparent from the above description. Initially, a thin sheet having generally planar first and second sides is provided from a roll of sheet metal stock. At a first station, the central hole is punched in the sheet. Then, the circular array of closely adjacent perforations is punched in the sheet. The array is coaxial with the central hole so as to form the interior portion defining the outline of the gear and the selvedge portion disposed outboard the perforations. The interior and selvedge portions are interconnected at this point by the plurality of web portions defined by the adjacent perforations.

At subsequent stations, the central hole and the perforations are progressively stamped until the central hole and the perforations have burnished faces perpendicular to the first and second sides of the sheet. Concurrently, the recesses are stamped on the first side of the gear. This stamping of the recesses forms the corresponding projections on the second side of the gear.

At a subsequent station, the web portions are broken to separate the gear from the selvedge portion. Preferably, the webbed portions are broken along a generally straight path between adjacent perforations so as to form a gear with generally squared off teeth. A predetermined number of gears are queued in a stack, and then arranged into an assembly. This is done by frictionally nesting the projections and corresponding recesses, whereby the central holes are aligned to form a bore adapted to be sufficiently press fit onto a shaft to maintain the gear rotationally and axially secured to the shaft.

It should be understood that while the form of the invention herein shown and described constitutes a preferred embodiment of the invention, it is not intended to illustrate all possible forms thereof. It also should be understood that the words used are words of description rather than limitation, and various changes may be made without departing from the spirit and scope of the invention disclosed.

I claim:

1. A laminated gear for installation upon a central shaft, the laminated gear comprising:

a plurality of laminates abutting each other in a stacked relationship, each laminate having:

a first planar side, a second planar side, and a circumferential edge, a projection on the first side of the laminate extending above the plane defined by the first side, a corresponding recess on the second side of the laminate depressed below the plane defined by the second side, a plurality of teeth formed in the circumferential edge of the laminate, each tooth having a relatively smooth burnished face region for cooperation with a mating gear, the burnished face being formed by progressive stamping so as to be perpendicular to the planar sides of the laminate, and a central hole therethrough; wherein the laminates are rotationally and axially held relative to each other in the stacked relationship by frictional nesting of the projections and corresponding recesses, aligning the central holes in the laminates to form a bore adapted to be sufficiently press fit onto the central shaft to maintain the laminated gear rotationally and axially secured thereto; and a cap laminate having:

a first planar side, a second planar side, and a circumferential edge, a throughhole extending between the first and second sides, a plurality of teeth formed in the circumferential edge of the laminate, each tooth having a relatively smooth burnished face region for cooperation with a mating gear, the burnished face being formed by progressive stamping so as to be perpendicular to the planar sides of the cap laminate, and a central hole therethrough; wherein the cap laminate is rotationally and axially held relative to the first planar side of an uppermost laminate of the plurality of laminates by frictional nesting of the cap laminate throughhole with the corresponding projection of the uppermost laminate.

2. The laminated gear of claim 1 wherein each laminate has a thickness of between 0.075 and 0.02 inch.

3. The laminated gear of claim 1 wherein the laminates are stamped out of sheet metal stock.

4. The laminated gear of claim 1 wherein the laminates are stamped out of cold rolled steel.

* * * * *